Sept. 12, 1933.   D. P. BOTTINI   1,926,935
MECHANICAL TRACTION OF AGRICULTURAL AND SIMILAR MACHINERY
Filed Dec. 12, 1930
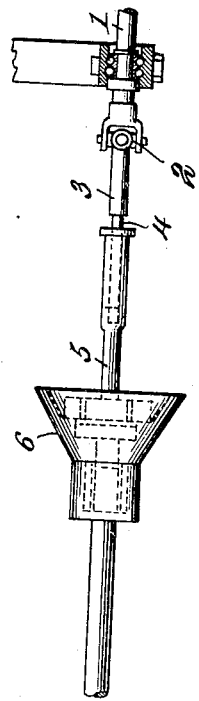
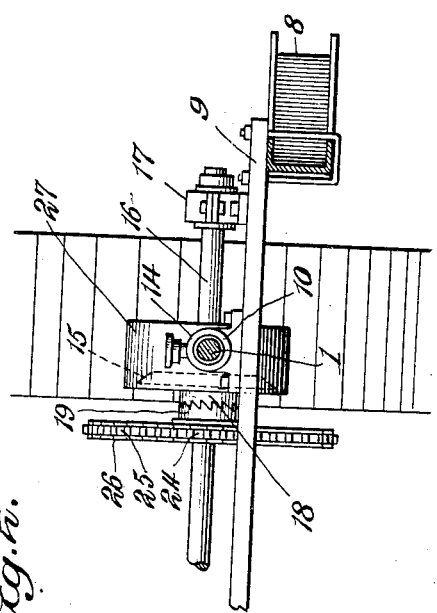
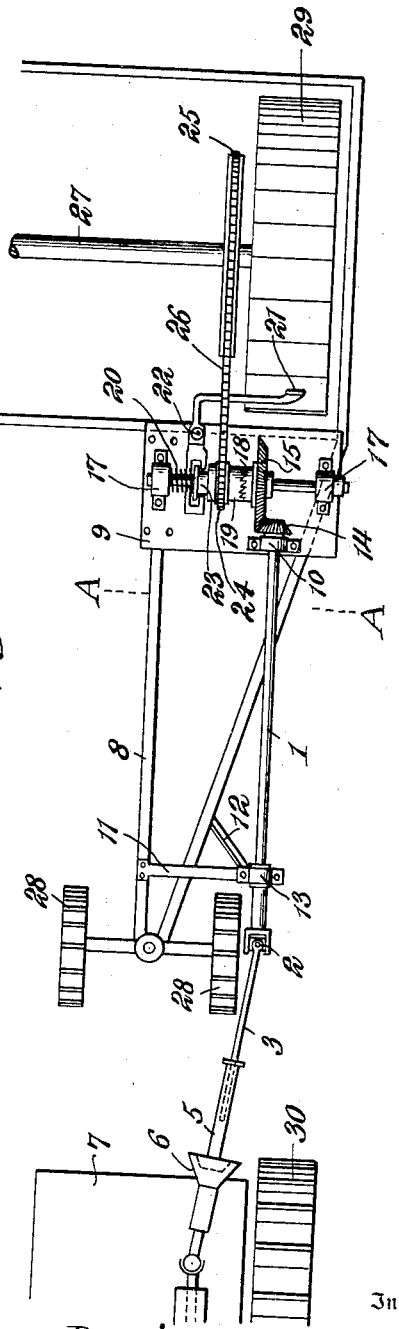
Inventor,
Domingo P. Bottini,
By Emil Bömelyck
Attorney Patented Sept. 12, 1933

1,926,935

UNITED STATES PATENT OFFICE 1,926,935

MECHANICAL TRACTION OF AGRICULTURAL AND SIMILAR MACHINERY

Domingo P. Bottini, Pergamino, Argentina

Application December 12, 1930, Serial No. 501,955, and in Argentina December 28, 1929

2 Claims. (Cl. 180—14)

This invention consists of certain improvements in the mechanical traction of agricultural and similar machinery, having as its feature the use of an auxiliary propeller, moved by the motor mechanism of the tractor, acting on the wheels of the machines coupled thereto, and thus diminishing the quantity of power necessary for traction, while at the same time it renders it easier to move the machinery, when on swampy or sandy land, when the tractor's wheels are likely to be unable to move, or to slide, or due to any other cause which lessens motive power. The invention referred to has also other uses, which are hereinafter explained, and are given in detail in the subsequent claims. In order that this invention be easily understood and put into practical use without any difficulty, I have represented its different aspects under its preferential form of construction, as shown in the drawing hereto attached.

Fig. 1 gives a front view of the device of which this invention consists, ready to transmit power from the mechanism of the tractor to one of the back wheels of a thresher and harvester.

Fig. 2 represents a section on line A—A of Fig. 1.

Fig. 3 shows a partial detail of the transmission shaft or telescopic coupling between the tractor and the coupled machine.

In the construction of this invention, as shown here, the propulsion or transmission of power from the tractor to the coupled machine, of any class whatever, is effected by means of shaft 1, whose end is provided with a union (articulated) type Cardan, universal, or of any other suitable form, due to which the shaft 1 can be united to shaft 3, forming an angle of varying range, and the power is transmitted from one shaft to the other at any angle whatever.

The end of shaft 3 has a bar 4, squared, which fits into coupling 5, which is joined to piece 6 that forms part of the motor mechanism of the tractor 7.

The squared bar 4 can be displaced longitudinally, in the coupling 5, and due to that movement of the telescopic coupling, this form of transmission can be subjected to lengthening or shortening, when changing the route of the tractor when turning it round. On the frame 8 of the harvester or similar machine, is fixed a piece 9, which supports a bearing 10, and towards the front of that frame, is placed a support 11, consolidated by means of a bar 12, on which is placed another bearing 13, that in union with the bearing 10 support the shaft 1.

At the end of that shaft 1 is placed a small conic gear 14, which acts on another similar gear 15 of greater diameter, placed on the shaft 16, perpendicular to the first, and supported by bearings 17 on the piece 9.

The reverse side of gear 15 is fixed to a coupling 18, also fixed on the shaft 16, and the latter is provided with a series of teeth, into which work the teeth of another similar coupling 19, which can move lengthwise, or along the shaft mentioned 16;—members 18 and 19 are united to each other due to spring 20, that placed on the side of bearing 17, compels piece 19 to remain geared with the former. A bar 21, articulated at 22, has an end like a fork, which fits into portion 23 of coupling 19, moving both. The toothed coupling 19 is fixed to a pinion 24, which by means of a chain 26 transmits movement to a gear 25 mounted on shaft 27 of the harvester or similar machine.

As may be observed, by reference to Fig. 2, on the conic gears 14 and 15 is placed a protecting casing 27, to prevent any accidents that might be caused by them.

In Fig. 1, 28 indicates the front wheels of the agricultural machine; 29 indicates one of the back wheels of the machine; and 30 indicates one of the motor wheels of the tractor.

As may be observed, by reference to the drawing, each time that for any reason whatever the wheel 30 of the tractor does not touch the ground firmly, as happens, for instance, when the machine is on swampy or sandy soil, then the motive power of the tractor lessens considerably, and it may stop altogether, due to the resistance of the machine coupled with it; however, the motive power of the tractor shaft is transmitted as already explained, to the back wheel of the coupled agricultural machine 29, which then acts as a moving wheel, and which due to its large surface acts perfectly on the ground, thus aiding the action of the tractor, which is greatly augmented.

When due to velocity of both vehicles, the tractor and the machine, the number of revolutions of the gear 25 is greater than that corresponding to the angular speed of the shaft 1 and consequently that of gear 15, then the members 18 and 19 do not engage each other, due to a ratchet mechanism; when on the other hand there is a diminution of speed of the machine, the wheel 30 being on soil, as previously specified, then the speed of the gear 25 will decrease, until the angular velocity of member 19 is the same as that of member 18, whose speed is constant, and from that moment the teeth are geared up, and then wheel 29 acts as a motor wheel.

When it be convenient to disconnect the transmission between both machines, it is only necessary to move the bar 21, which moves outwards the coupling 19, which slips the similar piece 18, thus leaving free the coupling of the tractor motor shaft. It is evident that this device, with slight variations, could be used to transmit movement to any sort of vehicles, without great modifications.

Having already described in detail this invention, as well as the manner of its use, I hereby claim as my exclusive right and property:

1. In a vehicle train comprising a tractor having driving ground wheels and a power shaft, a trailer having driving ground wheels, a coupling device providing a draft connection between the tractor and trailer, said coupling comprising a telescoping transmission shaft universally connected to the power shaft of the tractor and universally connected to a shaft on the trailer, a section of a clutch element having one-way ratchet teeth driven by the shaft on the trailer, a second section of the clutch element having one-way ratchet teeth adapted to engage and cooperate with the teeth of the first section of the clutch element for providing a driving connection therebetween, and means for providing a driving connection between the second section of the clutch element and the driving wheels of the trailer.

2. In a vehicle train comprising a tractor having driving ground wheels and a power shaft, a trailer having driving ground wheels, a coupling device providing a draft connection between the tractor and trailer, said coupling comprising a telescoping transmission shaft universally connected to the power shaft of the tractor and universally connected to a shaft on the trailer, a section of a clutch element having one-way ratchet teeth driven by the shaft on the trailer, a second section of the clutch element having one-way ratchet teeth adapted to engage and cooperate with the teeth of the first section of the clutch element for providing a driving connection therebetween, means for providing a driving connection between the second section of the clutch element and the driving wheels of the trailer, and means for resiliently urging the sections of the clutch element together to effect a positive drive in one direction of rotation and an overrunning drive in the opposite direction of rotation.

DOMINGO P. BOTTINI.